United States Patent [19]

Sal

[11] Patent Number: 4,939,841
[45] Date of Patent: Jul. 10, 1990

[54] CUTTING TOOL

[76] Inventor: Lieng H. Sal, 3843 Muscatel Ave., Rosemead, Calif. 90770

[21] Appl. No.: 241,827

[22] Filed: Sep. 6, 1988

Related U.S. Application Data

[63] Continuation of Ser. No. 917,555, Oct. 10, 1986, abandoned.

[51] Int. Cl.⁵ .............................................. B26B 3/00
[52] U.S. Cl. ........................................ 30/317; 30/309
[58] Field of Search ................... 30/308.1, 309, 314, 30/317; D8/7, 12

[56] References Cited

U.S. PATENT DOCUMENTS

| | | | |
|---|---|---|---|
| 164,880 | 6/1875 | Shelton | 30/314 |
| 261,707 | 7/1882 | Haseltine . | |
| 392,041 | 10/1888 | Lesson | 30/309 |
| 449,031 | 3/1891 | Bernard . | |
| 483,588 | 10/1892 | Sunderlin | 30/314 X |
| 718,847 | 1/1903 | Kelley | 30/314 |
| 1,073,565 | 9/1913 | Biehl | 30/309 |
| 1,398,850 | 11/1921 | Franco | 30/314 X |
| 2,004,100 | 6/1935 | Carter | 30/317 |
| 2,267,325 | 12/1941 | Dickerman | 306/38 |
| 3,280,457 | 10/1966 | Lewis et al. | 30/317 |
| 4,387,510 | 6/1983 | Hashemifard | 30/314 |

*Primary Examiner*—Frank T. Yost
*Assistant Examiner*—Michael D. Folkerts
*Attorney, Agent, or Firm*—Christie, Parker & Hale

[57] ABSTRACT

A cutting tool for cutting tree branches and small trees in a minimum of strokes of the tool, as well as for cutting bushes, plants, tall weeds and the like, includes an elongated rigid blade at least about 8 to 10 inches in length, an elongated handle at one end of the blade, a straight cutting edge extending most of the length of the blade, and a curved blade end which curves back toward the handle to form a generally U-shaped cutting end of the blade. The outer non-cutting portion of the blade is at least about ¼-inch thick and provides the principal mass of the blade. The inner portion of the blade tapers to form the straight cutting edge which is positioned to extend along an axis behind the axis of the handle to balance the tool for efficient cutting.

11 Claims, 1 Drawing Sheet

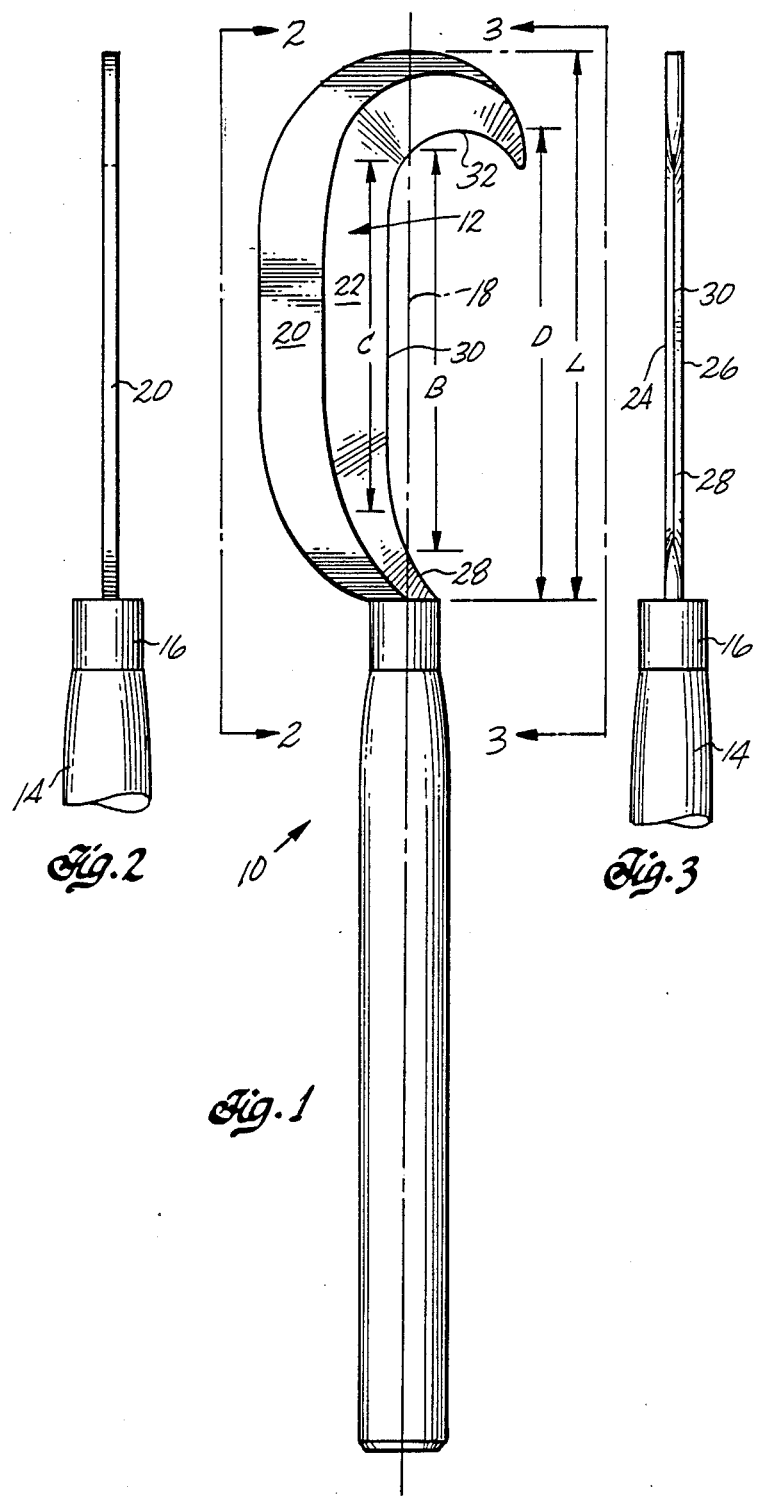

CUTTING TOOL

CROSS-REFERENCE TO RELATED APPLICATIONS

This is a continuation of application Ser. No. 917,555, filed Oct. 10, 1986, now abandoned.

FIELD OF THE INVENTION

This invention relates to cutting tools, and more particularly to a tool for manually cutting tall grass and weeds, as well as heavier growth such as tree branches, bushes and small trees with a minimum of cutting strokes.

BACKGROUND OF THE INVENTION

Many cutting tools, such as a sickle, are commonly used for cutting tall grass and weeds. The blade of a sickle is hooked around the weeds and pulled on as the weeds are cut. However, such a cutting tool is not useful for cutting heavier woody growth such as tree branches, the trunks of small trees, or bushes.

On the other hand, tools for cutting heavier woody growth, such as a saw blade or cutting shears, are not useful in cutting taller and more pliable vegetation such as weeds or grass.

There is a need for a versatile cutting tool which is capable of cutting tall grass and weeds as well as for cutting tree branches in two and even small trees with a minimum of cutting strokes. Such a tool can be useful to gardeners, tree and forestry workers, roadside workers who clear brush and the like, and farming and orchard workers for removal of weeds and other growth at different times during the year.

SUMMARY OF THE INVENTION

Briefly, one embodiment of this invention provides a cutting tool for cutting tree branches and small trees with a minimum of cutting strokes, while also cutting bushes, plants, tall grass and weeds, and the like. The tool includes an elongated rigid blade, at least about 9 to 10 inches in length, an elongated handle at one end of the blade, a straight cutting edge extending for most of the length of the blade, and a blade end which curves back toward the handle to form a generally U-shaped cutting end of the blade. The outer non-cutting portion of the blade is at least about ¼-inch thick and provides the principal mass of the blade. The inner portion of the blade tapers to form the straight blade edge, which is positioned to extend along an axis behind the axis of the handle to balance the tool for efficient cutting. The long, straight cutting edge provides a means for cutting large branches in two with sometimes a minimum of two angular cuts from opposite sides of the branch. The curved end of the tool is useful in pulling after a cut is made, although the curved edge is also useful in cutting tall pliable vegetation, such as tall weeds and grass. The balance provided by the positioning of the cutting edge of the blade relative to the handle makes it possible to distribute the force of the blow to the object being cut during a downward swinging movement of the tool. This, in combination with the mass of the blade, makes it possible to cut the tree branches and even the trunks of small trees with a minimum of cutting strokes. In addition, the tool efficiently cuts taller pliable vegetation with a minimum of sideways cutting strokes better than a sickle or other known prior art tools commonly used for cutting such vegetation.

These and other aspects of the invention will be more fully understood by referring to the following detailed description and the accompanying drawings.

DESCRIPTION OF THE DRAWINGS

FIG. 1 is a side elevation view illustrating a cutting tool according to principles of this invention.

FIG. 2 is a fragmentary end elevation view taken on line 2—2 of FIG. 1.

FIG. 3 is a fragmentary end elevation view taken on line 3—3 of FIG. 1.

DETAILED DESCRIPTION

A cutting tool 10 includes an elongated blade 12 rigidly affixed to the end of an elongated handle 14. A sleeve 16 at the base of the blade 12 fastens the blade to the upper end of the handle 14. The blade is at least about 8 to 10 inches long and at least about 2 inches wide along the long central maximum width portion of the blade. The handle is at least about 1½ times as long as the blade.

The length of the blade extends in the same general direction as the long axis 18 of the handle which is shown in phantom lines in FIG. 1. Most of the mass of the blade is behind the axis of the handle. With reference to FIG. 1, the left side of the axis 18 is to the rear of the axis and the right side of the axis is to the front of the axis in the sense that the cutting edge of the blade faces to the front of the blade. The blade is generally elongated and C-shaped. It tapers narrower at its bottom end to a width which matches the width of the sleeve 16. The blade is widened above the sleeve and curves away from the axis of the handle, in a direction behind the axis 18. The blade is then generally uniform in width and generally straight for most of the length of the blade. Near the outer end of the straight portion of the blade, the blade tapers narrower and curves back toward the axis 18. The end of the blade then curves back and tapers narrower progressively to form a U-shaped free end of the blade. The U-shaped end of the blade is on the front side of the axis 18.

The blade is preferably made from a high-grade steel which is at least about ¼-inch thick. The blade from one end to the other is divided generally into a non-cutting outer portion 20 and an inner cutting portion 22 with tapered opposite faces 24 and 26 forming a composite cutting edge of the blade. The cutting edge of the blade generally comprises a short bottom section 28 which curves from the inside of the handle back toward the axis 18 of the handle, extends across the axis 18, and then merges into a generally long and straight cutting edge 30 which extends for a majority of the overall length of the blade. The straight cutting edge 30 lies to the rear of the axis 18 for essentially its entire length. The cutting edge then curves back toward the axis 18 and extends to the front side of the axis where it forms a curved generally U-shaped cutting edge 32 at the free end of the blade. The long, straight cutting edge 30 extends for at least about 45 to 50 percent of the total length of the blade. In addition, the long, straight cutting edge portion 30 extends for at least about 55 to 60 percent of the effective length of the blade cutting edge. The length of the straight cutting edge portion 30 is approximately centered along the length of the blade. The cutting edge portion which extends behind the axis 18 is approximately 65 to 70 percent of the overall length of the blade. A major length of the U-shaped outer cutting edge 32 of the blade extends to the front side of the axis 18. Approximately one-half of the width of the blade, from one end to the other, is tapered to form the opposite faces 24 and 26 of the cutting edge. Thus, approximately the outer half of the blade, i.e., the non-cutting portion 20, is of generally uniform thickness and provides the maximum thickness portion of the blade.

In one embodiment, the overall length L of the blade is about 10½ inches. The length C of the long, straight cutting edge portion 30 of the blade is about 5 to 6 inches. The effective length D of the blade cutting edge is approximately 8½ to 9 inches long. The length B of the cutting edge portion which extends behind the axis 18 is approximately 7 inches. The entire length of this straight cutting edge of the blade is spaced to the rear of the axis 18 of the handle. The effective length of the handle portion of the tool (from the top of the sleeve 16 to the bottom of the handle) is about 17 inches. However, the handle can be much longer; and in another embodiment, the handle is about 45 inches long. The blade is approximately 2½ inches in width, along the wider portion of the tool in the vicinity of the straight cutting edge 30. The blade is ¼-inch thick metal, along the non-cutting outer portion 20 of the blade. The faces 24 and 26 of the composite blade edge taper away from the non-cutting outer portion, for about half the width of the blade, to form the blade cutting edge. The U-shaped outer cutting edge 32 is about 3 inches wide and has a depth of about 1 inch.

The components of the cutting tool are constructed and arranged in this combination so as to balance the tool to provide effective weight distribution and location of the cutting blade relative to the handle. This also locates the mass of the long blade so that the force of a cutting stroke can be effectively transmitted. Most of the mass of the blade is located behind the axis of the handle, and most of the length of the blade cutting edge also is located behind the axis of the handle, as is most of the length of the straight cutting edge portion 30. The handle is substantially longer than the blade. This combination provides good balance together with good leverage during a cutting stroke. In addition, it ensures that a substantial mass of the blade is available for impact force when striking a blow and when the straight cutting edge strikes the object from an overhead swinging of the arm in a downward stroke. This transfers an efficient portion of the impact energy to the object being cut. For instance, a similar tool made with a blade that is either curved in a C shape similar to a sickle, or has a straighter cutting edge located essentially entirely in front of the axis of a long handle, will produce substantially inferior cutting of heavier and more woody vegetation such as tree branches, the trunks of small trees, and the like. Experimental use of the cutting tool of this invention has demonstrated that large branches of a hardwood tree as much as 2 inches thick can be cut in two with a minimum of two angular cuts.

In addition, the tool is unusually effective at cutting tall grass and weeds because the weight of the blade combined with the location of its cutting edge relative to the handle axis is effective in distributing the blow so that such vegetation can be impacted by the cutting edge followed by a quick pulling motion which causes the curved blade edge 32 to separate the cut vegetation from the point of impact. The tool has proved to be substantially better at cutting tall grass and weeds than a sickle, for example. It is also substantially more effective and faster at manually cutting heavier woody growth than cutting shears or a saw blade.

what is claimed is:

1. A cutting tool capable of manually cutting heavy growth such as tree branches with a minimum of cutting strokes, comprising an elongated handle, and an elongated rigid metal blade secured to an end of the handle, the blade having a length (L) of at least about 8 to 10 inches and a width of at least about 2 inches to provide a substantial mass of the blade distributed along the blade length, in which the handle is longer than the blade length, the blade being arranged relative to the handle for positioning a majority of the weight of the blade behind the central longitudinal axis of the handle, the blade having an inside portion tapering to form an elongated substantially straight cutting edge portion (C) extending for at least about half of the blade length, and wherein the majority of the long, straight cutting edge portion of the blade also lies behind the central longitudinal axis of the handle, the free end of the blade tapering narrower and forming a curved generally U-shaped end portion of the blade, in which the long, straight cutting edge portion of the blade merges into a curved inside cutting edge at the free end of the blade extending to the side of the central longitudinal axis of the handle opposite from the straight cutting edge portion, and in which the blade has a substantial portion of its length comprising a non-cutting outer portion behind the cutting edge with a blade thickness of at least about one-fourth inch to thereby balance the blade and provide mass for effective cutting by the straight cutting edge.

2. Apparatus according to claim 1 in which the long, straight cutting edge of the blade extends along the central portion of the length of the blade cutting edge.

3. Apparatus according to claim 1 in which the continuous blade edge has an overall length (D), a majority of which extends behind the central longitudinal axis of the handle.

4. Apparatus according to claim 3 in which a majority of the length of the curved end portion of the blade edge extends in front of the central longitudinal axis of the handle.

5. Apparatus according to claim 4 in which the length of the handle is at least about 1½ times the length of the blade.

6. A cutting tool capable of manually cutting heavy growth such as tree branches with a minimum of cutting strokes, comprising an elongated handle, and an elongated rigid metal blade extending away from an end of a sleeve which is rigidly affixed to an end of the handle, the blade having a length (L) of at least about 8 to 10 inches extending from the end of the sleeve to a free end of the blade, and a width of at least about 2 inches, to provide a substantial mass of the blade distributed along the blade length; and which the handle is longer is than the blade length; the blade being arranged relative to the handle for positioning a majority of the weight of the blade behind the central longitudinal axis of the handle, the blade having an elongated cutting edge having a lower portion extending from the end of the sleeve in front of the central longitudinal axis of the handle to an elongated substantially straight cutting edge portion (C) extending for at least about half of the blade length, and wherein the majority of the long, straight cutting edge portion of the blade lies behind the central longitudinal axis of the handle; the free end portion of the blade tapering and forming a curved generally U-shaped end portion of the blade, in which the long, straight cutting edge portion of the blade merges into a curved inside cutting edge at the free end of the blade extending to the front side of the central longitudinal axis of the handle opposite from the straight cutting edge portion; and in which the blade has a substantial portion of its length comprising a non-cutting outer portion behind the cutting edge with a blade thickness of at least one-fourth inch to thereby balance the blade and provide mass for effective cutting by the straight cutting edge.

7. Apparatus according to claim 6 in which the bottom of the lower cutting edge portion extends immediately from the end of the sleeve along a curve to behind the central longitudinal axis of the handle.

8. Apparatus according to claim 6 in which the long straight cutting edge portion of the blade extends along the central portion of the length of the blade cutting edge.

9. Apparatus according to claim 6 in which the continuous blade edge has an overall length (D), a majority of which extends behind the central longitudinal axis of the handle.

10. Apparatus according to claim 9 in which a majority of the length of the curved free end portion of the blade edge extends in front of the central longitudinal axis of the handle.

11. Apparatus according to claim 10 in which the length of the handle is at least about 1½ times the length of the blade.

* * * * *

UNITED STATES PATENT AND TRADEMARK OFFICE
CERTIFICATE OF CORRECTION

PATENT NO. : 4,939,841
DATED : July 10, 1990
INVENTOR(S) : Lieng H. Sal

It is certified that error appears in the above-identified patent and that said Letters Patent is hereby corrected as shown below:

Column 4, line 4, change "what is claimed is" to -- What is claimed is --.

Column 4, line 57, after "longer" delete "is".

Signed and Sealed this

Twelfth Day of November, 1991

Attest:

HARRY F. MANBECK, JR.

*Attesting Officer*  *Commissioner of Patents and Trademarks*